(12) United States Patent
Chiang et al.

(10) Patent No.: US 7,492,285 B2
(45) Date of Patent: Feb. 17, 2009

(54) WIRELESS CURSOR CONTROL DEVICE

(75) Inventors: Hsiao-Lung Chiang, Taipei (TW); Chin-Kuan Lou, Taipei (TW)

(73) Assignee: Primax Electronics Ltd., Taipei (TW)

( * ) Notice: Subject to any disclaimer, the term of this patent is extended or adjusted under 35 U.S.C. 154(b) by 241 days.

(21) Appl. No.: 11/422,549

(22) Filed: Jun. 6, 2006

(65) Prior Publication Data
US 2007/0171096 A1 Jul. 26, 2007

(30) Foreign Application Priority Data
Jan. 10, 2006 (TW) ............................... 95100877 A

(51) Int. Cl.
*H03K 17/00* (2006.01)
(52) U.S. Cl. ........................... 341/20; 341/22; 345/163; 345/169; 455/557
(58) Field of Classification Search ................... 341/20, 341/22; 710/62, 1, 64, 303, 105; 345/163, 345/169; 455/557, 88
See application file for complete search history.

(56) References Cited

U.S. PATENT DOCUMENTS

| 6,801,967 | B2 * | 10/2004 | Nakamura et al. ............ 710/62 |
| 6,909,421 | B2 * | 6/2005 | Wang .......................... 345/163 |
| 2006/0007151 | A1 * | 1/2006 | Ram .......................... 345/163 |
| 2008/0001922 | A1 * | 1/2008 | Johnson et al. ............. 345/166 |

* cited by examiner

*Primary Examiner*—Albert K Wong
*Assistant Examiner*—Hung Q Dang
(74) *Attorney, Agent, or Firm*—Apex Juris, pllc; Tracy M Heims

(57) ABSTRACT

A wireless cursor control device for use with a computer system includes a main body, a wireless signal receiver, a storing portion and a resilient pad member. The main body generates a wireless signal to control a cursor of the computer system. The wireless signal receiver is swappable to be electrically connected to the computer system for receiving the wireless signal. The storing portion is disposed in the main body for accommodating the wireless signal receiver. The resilient pad member is engaged with the bilateral sides of the storing portion, and deformed to generate a restoring force when the wireless signal receiver is inserted into the storing portion. The resilient pad member is sustained against the wireless signal receiver according to the restoring force.

7 Claims, 7 Drawing Sheets

US 7,492,285 B2

WIRELESS CURSOR CONTROL DEVICE

FIELD OF THE INVENTION

The present invention relates to a wireless cursor control device, and more particularly to a wireless cursor control device for use with a computer system.

BACKGROUND OF THE INVENTION

Nowadays, mice, keyboards or network cameras become essential peripheral devices of computer systems. As known, when the wired peripheral device is used, the wire linkage is very troublesome and inconvenient because an additional signal wire is employed to connect the computer with the peripheral device. In addition, it is difficult to store the signal wire. In comparison with the wired peripheral technology, the wireless peripheral device is more user-friendly. With increasing development of these peripheral devices, wireless communication technologies have experienced great growth and are rapidly gaining in popularity.

Among these wireless peripheral devices, the wireless mouse and the wireless keyboard are popularly served as input devices in the industry. Take a wireless mouse for example. Instead of using the signal wire, when the wireless mouse is operated, a corresponding wireless signal receiver is used for receiving the wireless signal issued from the wireless mouse. The wireless signal receiver is connected to the universal serial bus (USB) port of the host computer. Therefore, the signals generated from the wireless mouse can be transmitted to the host computer via the wireless signal receiver. Although this wireless mouse is convenient because no signal wire is required, this wireless mouse still has several drawbacks. For example, when the wireless mouse is operated, a corresponding wireless signal receiver is necessary. In a case that this wireless mouse is used in other places, the user should carry the corresponding wireless signal receiver at the same time. In other words, if the wireless mouse and the wireless signal receiver are separately stored, the probability of losing either the wireless mouse or the wireless signal receiver is increased. Under this circumstance, the wireless mouse fails to be normally operated.

For a purpose of solving such a problem, a storing structure of a wireless signal receiver is disclosed in Taiwanese Patent No. M270432, and the contents of which are hereby incorporated by reference. Referring to FIG. 1, the storing structure disclosed in Taiwanese Patent No. M270432 is illustrated. The wireless mouse 1 is stored within a storing portion 11 in the bottom surface thereof. The wireless signal receiver 2 for use with the wireless mouse 1 comprises a handle portion 21 corresponding to an indentation structure 21 in the vicinity of the outlet of the storing portion 11. The handle portion 21 may facilitate the user to withdraw the wireless signal receiver 2 from the storing portion 11 of the wireless mouse 1. For storing the wireless signal receiver 2, the wireless signal receiver 2 is interference fitted into the storing portion 11 of the wireless mouse 1. In other words, the dimension of the wireless signal receiver 2 considerably conforms to the storing portion 11. Since the friction forces between the wireless signal receiver 2 and the storing portion 11 are balanced, the wireless signal receiver 2 can be firmly secured within the storing portion 11 of the wireless mouse 1 so as to effectively store the wireless signal receiver 2. Unfortunately, if the process of removing/inserting the wireless signal receiver 2 from/into the storing portion 11 of the wireless mouse 1 is repeatedly done for a long term, the wireless signal receiver 2 may no longer be interference fitted into the storing portion 11 of the wireless mouse 1. As a consequence, the wireless signal receiver 2 is likely to loosen or fall off because the wireless signal receiver 2 is not firmly secured within the storing portion 11 of the wireless mouse 1. Under this circumstance, the storing device of the wireless mouse is troublesome and not user-friendly.

In views of the above-described disadvantages resulted from the prior art, the applicant keeps on carving unflaggingly to develop a wireless cursor control device according to the present invention through wholehearted experience and research.

SUMMARY OF THE INVENTION

It is an object of the present invention to provide a wireless cursor control device for use with a computer system.

In accordance with an aspect of the present invention, the wireless cursor control device includes a main body, a wireless signal receiver, a storing portion and a resilient pad member. The main body generates a wireless signal to control a cursor of the computer system. The wireless signal receiver is swappable to be electrically connected to the computer system for receiving the wireless signal. The storing portion is disposed in the main body for accommodating the wireless signal receiver. The resilient pad member is engaged with the bilateral sides of the storing portion, and deformed to generate a restoring force when the wireless signal receiver is inserted into the storing portion. The resilient pad member is sustained against the wireless signal receiver according to the restoring force.

In an embodiment, the main body is a main body of a wireless mouse, and the computer system is selected from one of a personal computer and a notebook computer.

In an embodiment, the storing portion comprises a first indentation structure and a second indentation structure in the bilateral side thereof to be engaged with the resilient pad member.

In an embodiment, the resilient pad member includes a first resilient semi-cylindrical pad and a second resilient semi-cylindrical pad to be sustained against the wireless signal receiver when the wireless signal receiver is stored within the storing portion.

In an embodiment, the first resilient semi-cylindrical pad and the second resilient semi-cylindrical pad are respectively embedded within the first indentation structure and the second indentation structure, and have a first trench structure and a second trench structure engaged with bilateral edges of a bottom plate of the storing portion.

In an embodiment, the wireless signal receiver further comprises a first notch and a second notch to be engaged with the first resilient semi-cylindrical pad and the second resilient semi-cylindrical pad of the resilient pad member.

In an embodiment, the storing portion further comprises a third indentation structure for accommodating a universal serial bus connector of the wireless signal receiver therein, thereby facilitating positioning the wireless signal receiver within the storing portion.

In an embodiment, the wireless cursor control device further comprises a power switch unit in communication with the third indentation structure of the storing portion, wherein the wireless cursor control device is powered off when the wireless signal receiver is stored within the storing portion and the universal serial bus connector of the wireless signal receiver touches the power switch unit.

In an embodiment, the wireless signal receiver is stored within the storing portion by a depressing approach and the first resilient semi-cylindrical pad, and the second resilient semi-cylindrical pad of the resilient pad member are sustained against the wireless signal receiver after the resilient pad member is engaged within the storing portion.

In an embodiment, the length of the storing portion is slightly greater than that of the wireless signal receiver, and the storing portion has an inclined plane for facilitating the wireless signal receiver to be stored within the storing portion in a slidable manner, so that the first resilient semi-cylindrical pad and the second resilient semi-cylindrical pad of the resilient pad member are sustained against the wireless signal receiver.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
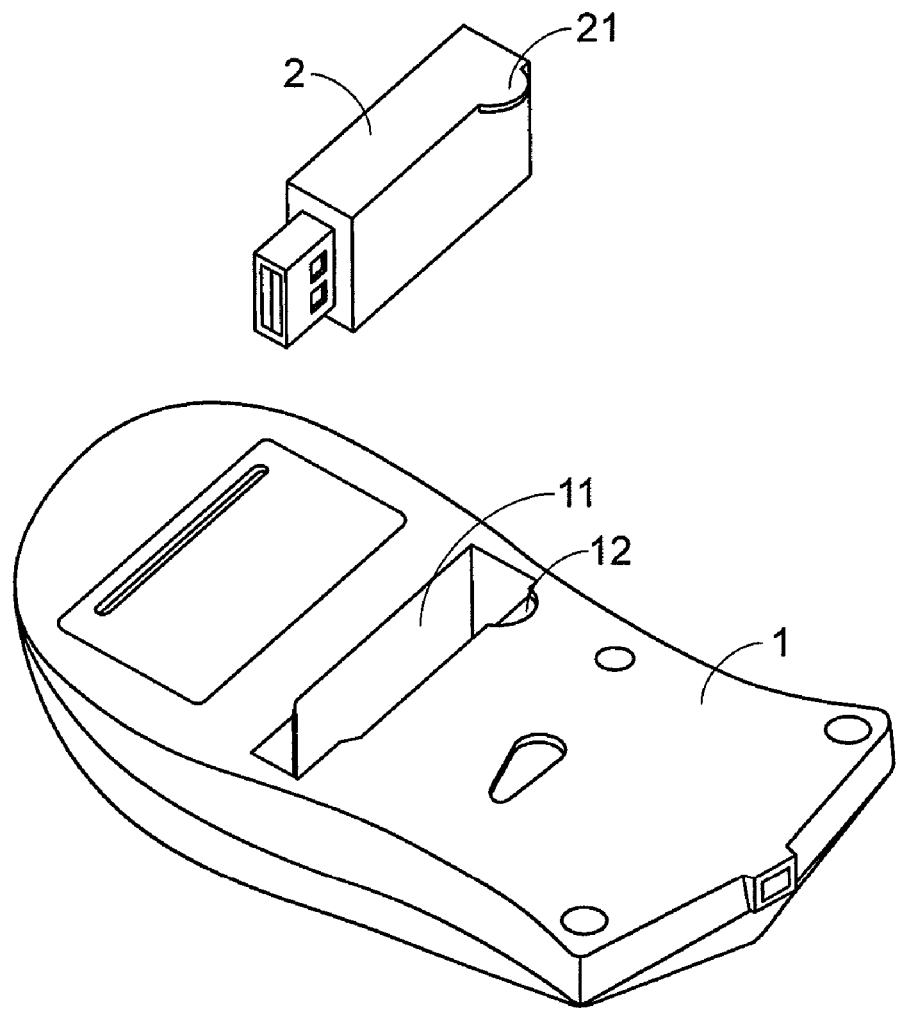
FIG. 1 is a schematic view of a wireless mouse having a storing structure according to prior art.
Figure 2A:
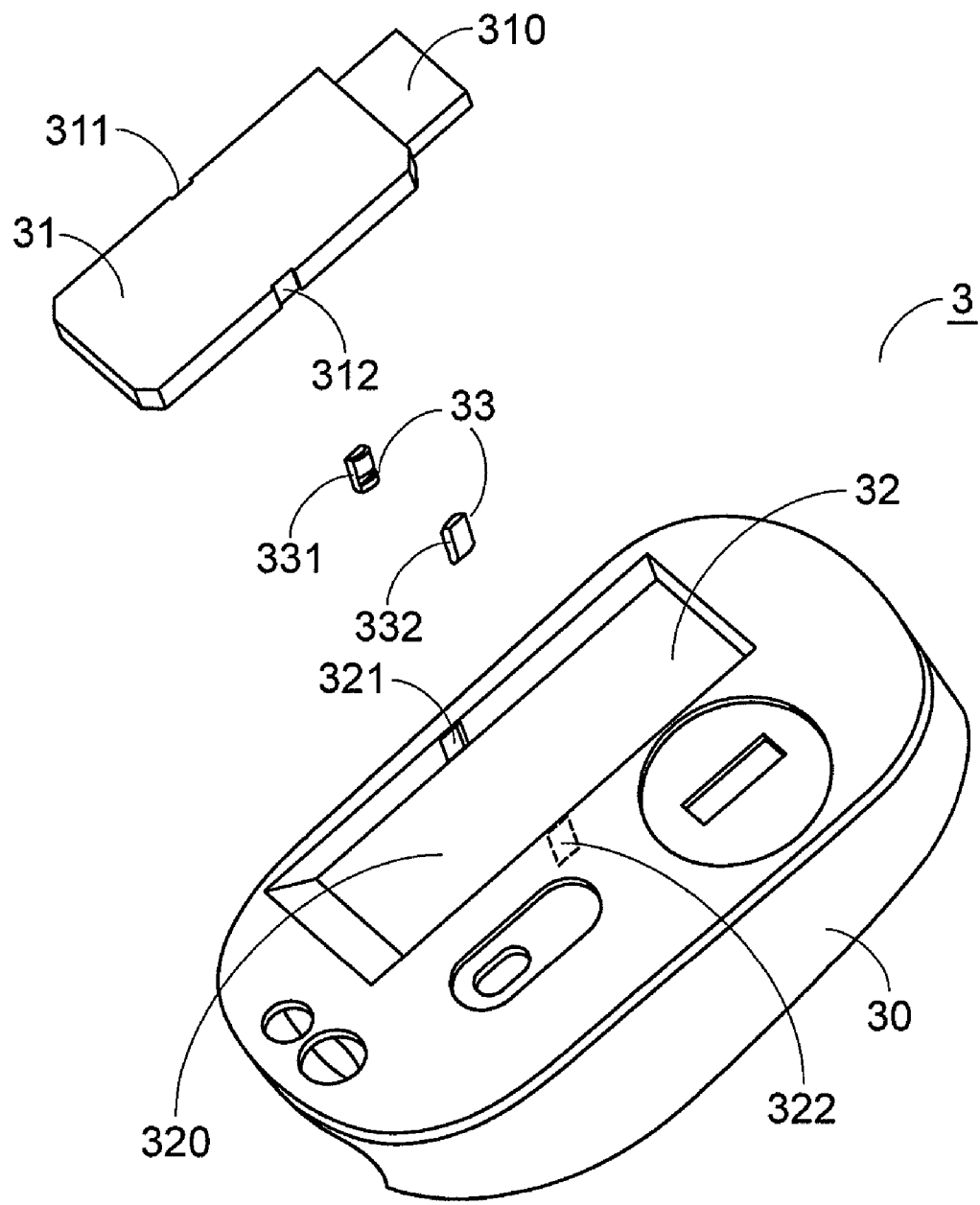
FIG. 2(a) is an exploded view of a wireless cursor control device according to a first preferred embodiment of the present invention.

Referring to FIG. 2(a), an exploded view of a wireless cursor control device according to a first preferred embodiment of the present invention is illustrated. In this embodiment, the wireless cursor control device is a wireless mouse 3 applicable to a personal computer or a notebook computer. The wireless mouse 3 shown in FIG. 2(a) comprises a main body 30, a wireless signal receiver 31, a storing portion 32 and a resilient pad member 33. When the wireless signal receiver 31 is plugged or swapped in a USB port (not shown) of a host computer, the signals generated from the main body 31 can be transmitted to the host computer via the wireless signal receiver 31. According to some major features of the present invention, the storing portion 32 and the resilient pad member 33 are used for storing the wireless signal receiver 31 and facilitating fixing the wireless signal receiver 31, respectively. The operation principle of the present invention will be illustrated as follows in more details.

Figure 2B:
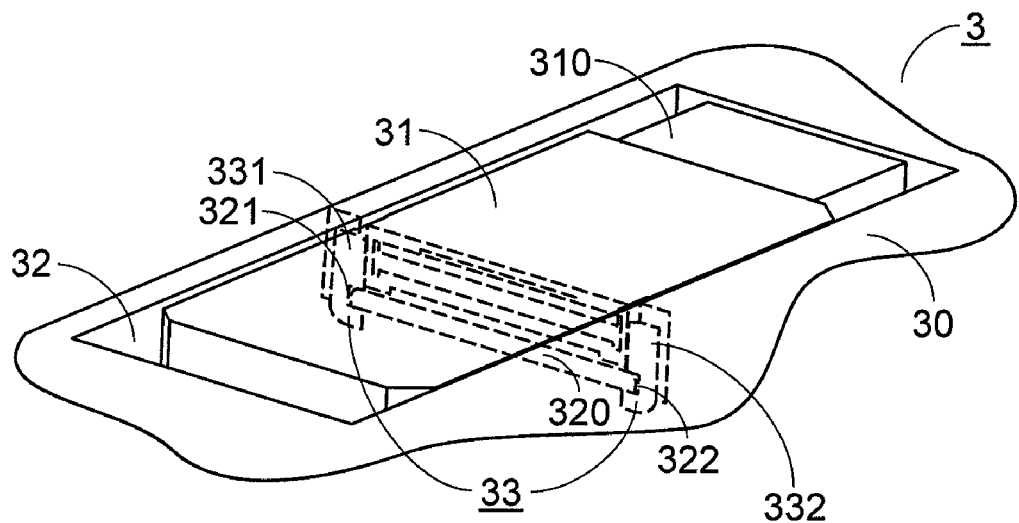
FIG. 2(b) is a schematic view illustrating that the resilient pad member is coupled with the storing portion according to the first preferred embodiment of the present invention.
Figure 2C:
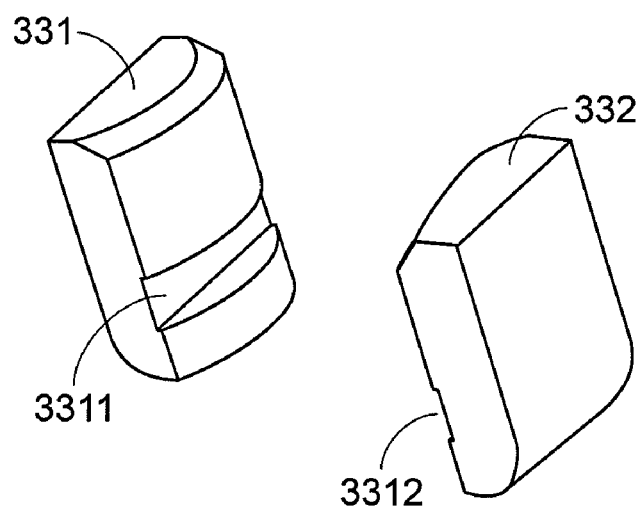
FIG. 2(c) is a schematic view of the resilient pad member used in the present invention.

Please refer to FIG. 2(b), which is a schematic view illustrating that the resilient pad member 33 is coupled with the storing portion 32. An enlarged view of the resilient pad member 33 is illustrated in FIG. 2(c). The dimension of the wireless signal receiver 31 conforms to the storing portion 32. As also shown in FIGS. 2(a) and 2(b), the storing portion 32 further comprises a first indentation structure 321 and a second indentation structure 322 in the sidewalls thereof. In this embodiment, the resilient pad member 33 includes a first resilient semi-cylindrical pad 331 and a second resilient semi-cylindrical pad 332. The first resilient semi-cylindrical pad 331 and the second resilient semi-cylindrical pad 332 are embedded into the first indentation structure 321 and the second indentation structure 322, respectively. Furthermore, the first resilient semi-cylindrical pad 331 and the second resilient semi-cylindrical pad 332 have a first trench structure 3311 and a second trench structure 3312 engaged with bilateral edges of the bottom plate 320 of the storing portion 32, respectively. The resilient pad member 33 is deformed and compressed in response to an external force, and returns to its original shape due to a restoring force generated from the compressed resilient pad member 33. Moreover, due to the restoring force generated from the compressed resilient pad member 33, the resilient pad member 33 is firmly secured to the storing portion 32 when the first resilient semi-cylindrical pad 331 and the second resilient semi-cylindrical pad 332 of the resilient pad member 33 are engaged with the first indentation structure 321 and the second indentation structure 322, respectively.

Figure 2D:
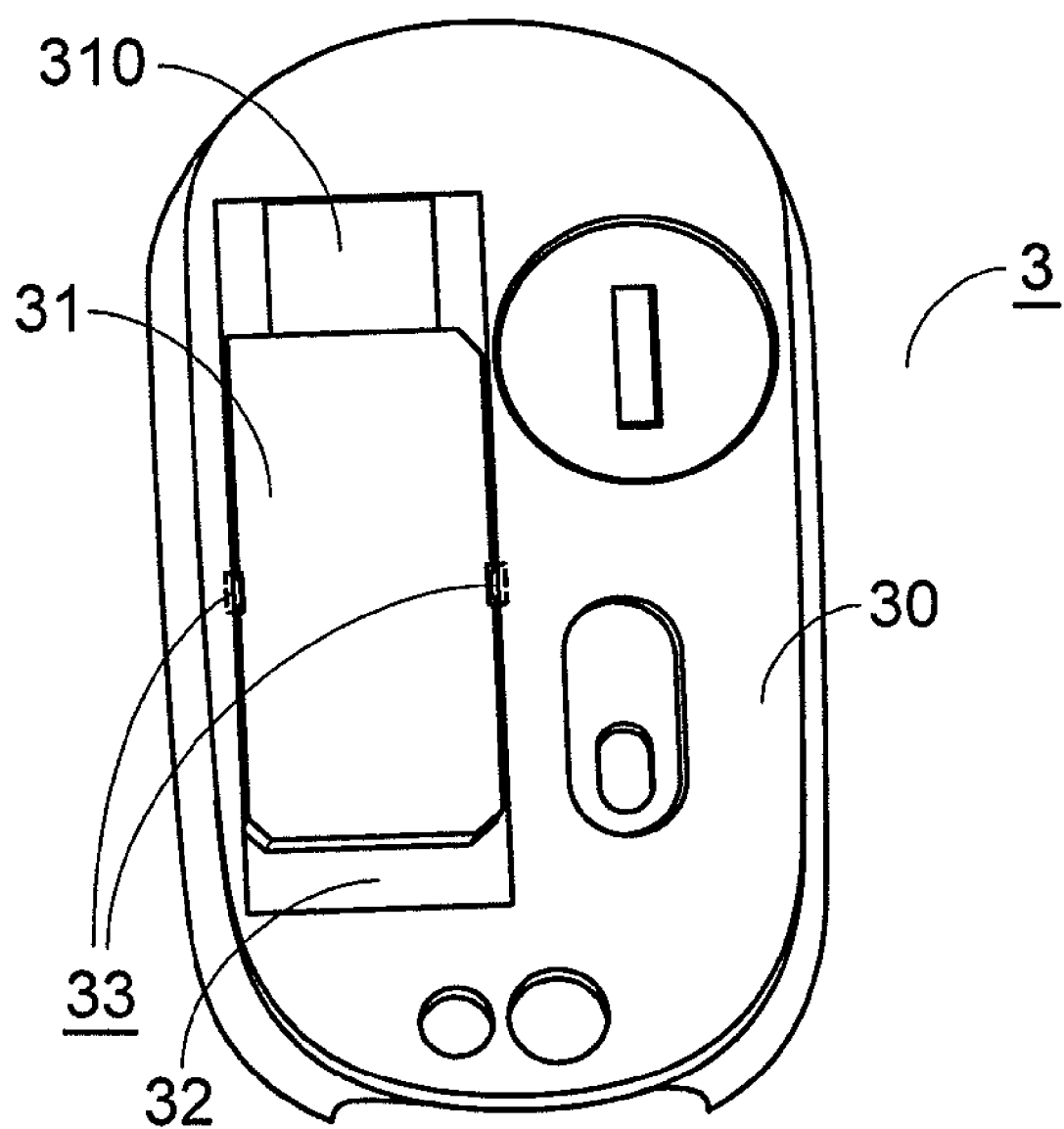
FIG. 2(d) is a schematic view illustrating that the wireless signal receiver is completely accommodated within the storing portion according to the first preferred embodiment of the present invention.

After the resilient pad member 33 is secured to the storing portion 32, the wireless signal receiver 31 can be accommodated within the storing portion 32, as is shown in FIG. 2(d). During the wireless signal receiver 31 is inserted into the storing portion 32, the wireless signal receiver 31 will be sustained against the first resilient semi-cylindrical pad 331 and the second resilient semi-cylindrical pad 332 of the resilient pad member 33. Since the wireless signal receiver 31 is supported by the first resilient semi-cylindrical pad 331 and the second resilient semi-cylindrical pad 332 of the resilient pad member 33, the wireless signal receiver 31 is securely positioned within the storing portion 32 without loosening or falling off.

In accordance with the major feature of the present invention, the first resilient semi-cylindrical pad 331 and the second resilient semi-cylindrical pad 332 of the resilient pad member 33 are sustained against the wireless signal receiver 31 after the resilient pad member 33 is secured to the storing portion 32. Optionally, the bilateral sides of the wireless signal receiver 31 may include a first notch 311 and a second notch 312 to be engaged with the first resilient semi-cylindrical pad 331 and the second resilient semi-cylindrical pad 332 of the resilient pad member 33, thereby facilitating securely positioning the wireless signal receiver 31 within the storing portion 32.

Figure 3A:
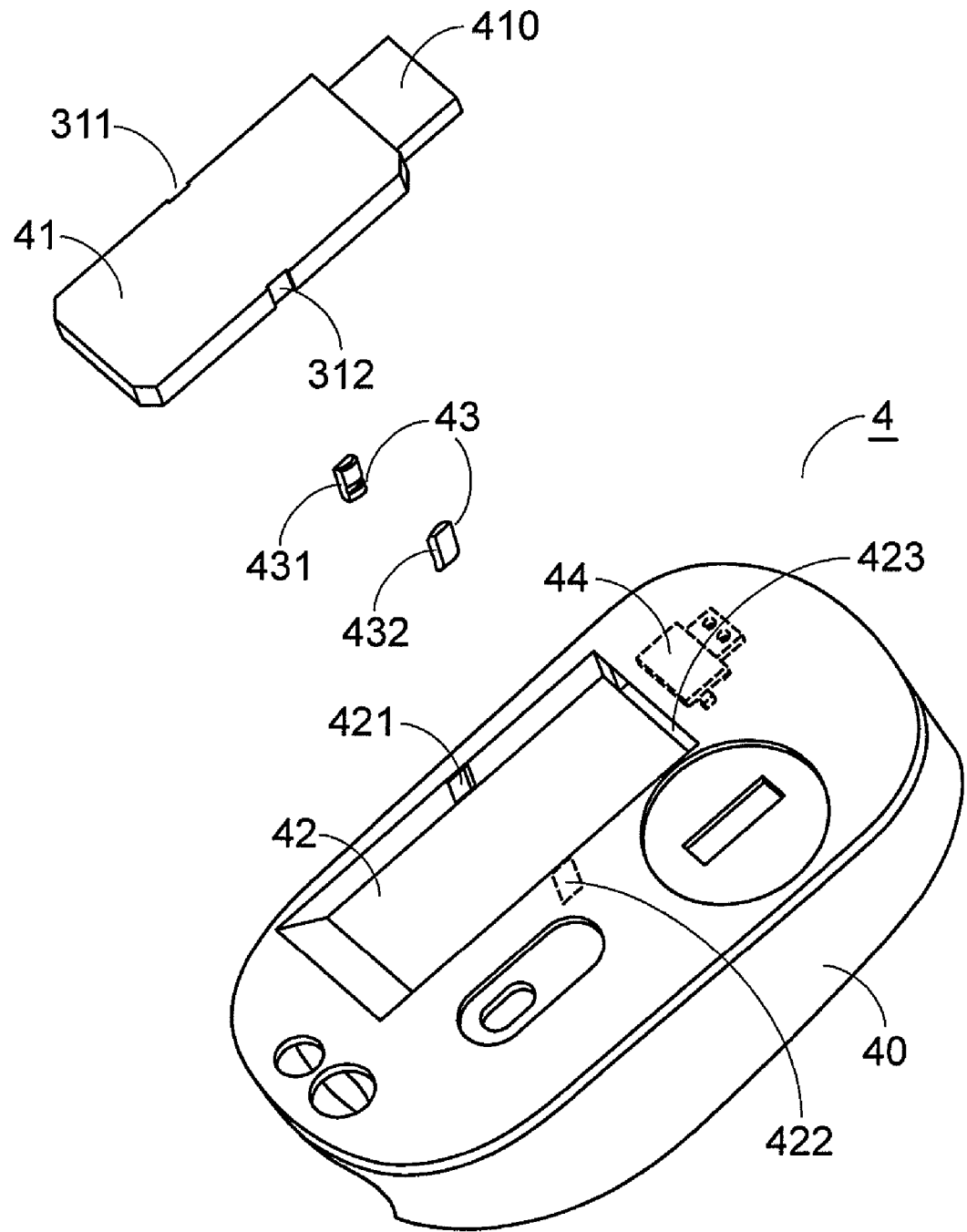
FIG. 3(a) is an exploded view of a wireless cursor control device according to a second preferred embodiment of the present invention.
Figure 3B:
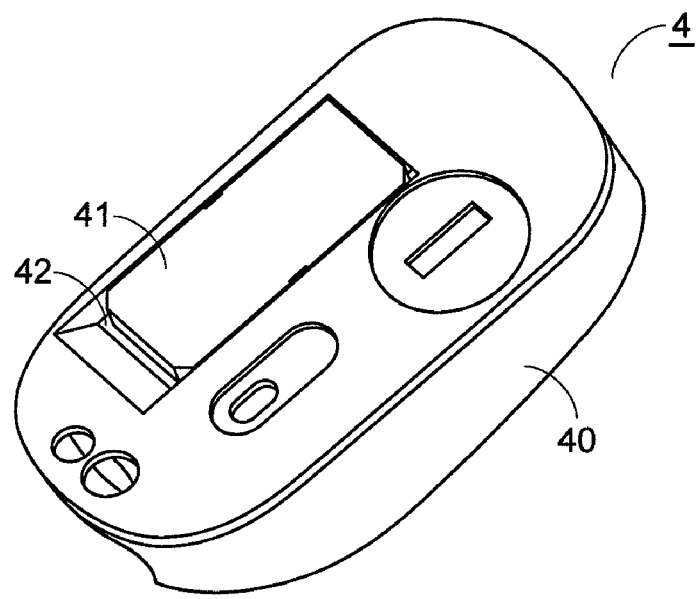
FIG. 3(b) is a schematic view illustrating that the wireless signal receiver is completely accommodated within the storing portion according to the second preferred embodiment of the present invention.
Figure 3C:
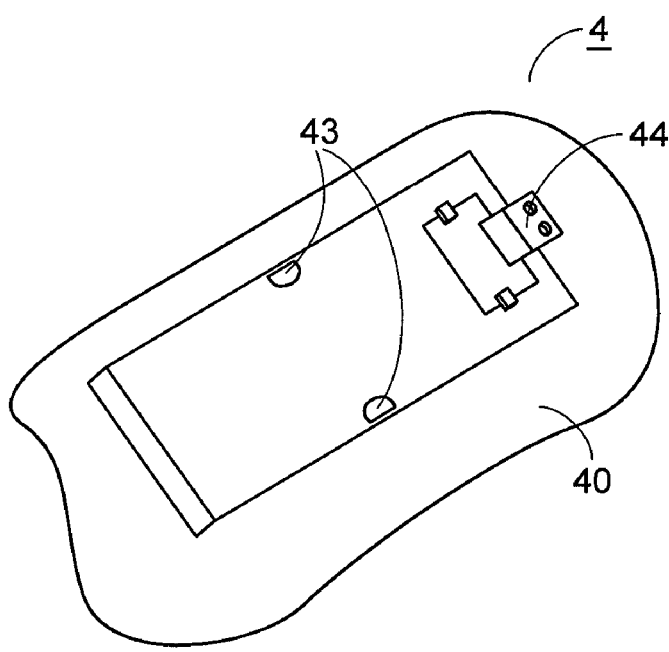
FIG. 3(c) is a schematic cross-sectional view illustrating the location of the power switch unit in the wireless mouse.

A further embodiment of a wireless mouse is illustrated in FIG. 3(a). In this embodiment, the wireless mouse 4 as shown in FIG. 3(a) comprises a main body 40, a wireless signal receiver 41, a storing portion 42 and a resilient pad member 43. The storing portion 42 comprises a first indentation structure 421 and a second indentation structure 422 in the sidewalls thereof. In addition, the storing portion 42 comprises a third indentation structure 423 at the topside thereof. Likewise, the resilient pad member 43 includes a first resilient semi-cylindrical pad 431 and a second resilient semi-cylindrical pad 432 engaged with the first indentation structure 421 and the second indentation structure 422 of the storing portion 42, respectively. After the resilient pad member 43 is secured to the storing portion 42, the wireless signal receiver 41 can be accommodated within the storing portion 42, as is shown in FIG. 3(b). Likewise, during the wireless signal receiver 41 is inserted into the storing portion 42, the wireless signal receiver 41 will be sustained against the first resilient semi-cylindrical pad 431 and the second resilient semi-cylindrical pad 432 of the resilient pad member 43. In addition, since the USB connector 410 at the front end of the wireless signal receiver 41 is embedded into the third indentation structure 423 of the storing portion 42, the wireless signal receiver 41 will be securely positioned within the storing portion 42. Moreover, as shown in FIG. 3(c), the wireless mouse 4 further comprises a power switch unit 44, which is arranged inside the main body 40 and in communication with the third indentation structure 423 of the storing portion 42. During the process of inserting the wireless signal receiver 41 into the storing portion 42, the USB connector 410 of the wireless signal receiver 41 is penetrated through the third indentation structure 423 and then touches the power switch unit 44. Once the USB connector 410 of the wireless signal receiver 41 touches the power switch unit 44, the wireless mouse 4 is automatically powered off. Under this circumstance, no power consumption of the wireless mouse 4 is rendered when the wireless signal receiver 41 is stored within the storing portion 42. By the way, some operation principles are similar to those described in FIG. 2, and are not to be redundantly described herein.

Figure 4A:
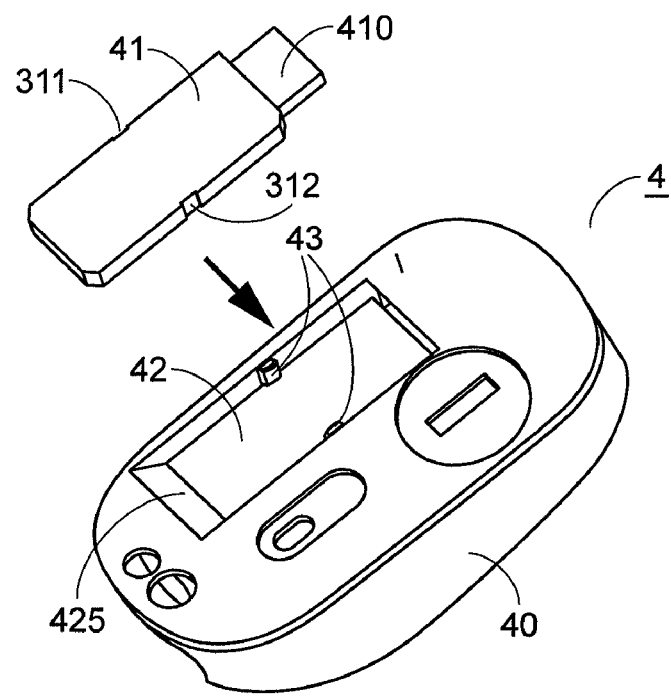
FIGS. 4(a) and 4(b) are schematic views illustrating two approaches of inserting the wireless signal receiver into the storing portion.
Figure 4B:
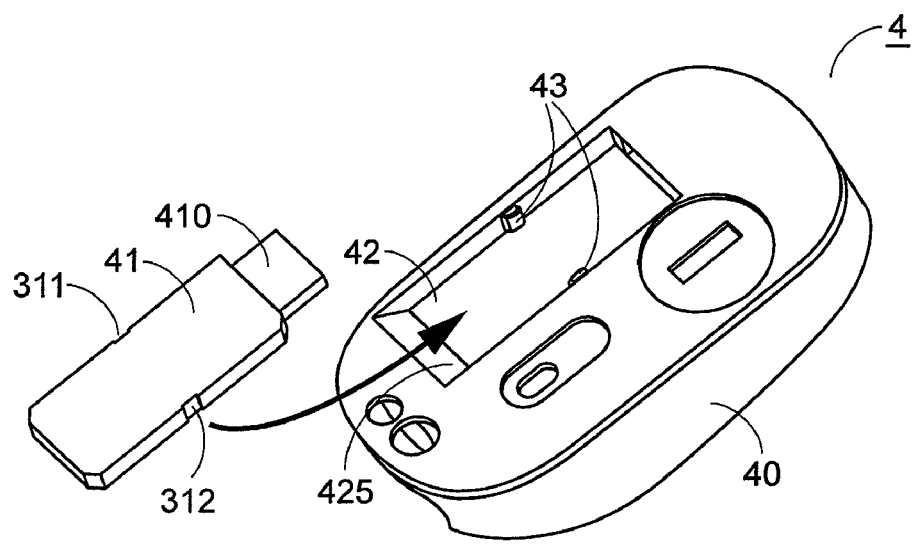

Referring to FIGS. 4(a) and 4(b), two approaches of inserting the wireless signal receiver 41 into the storing portion 42 are illustrated. In FIG. 4(a), the wireless signal receiver 41 is inserted into the storing portion 42 by depressing the wireless signal receiver 41. On the other hand, as shown in FIG. 4(b), since the storing portion 42 has an inclined plane 425 and the length of the storing portion 42 is slightly greater than that of the wireless signal receiver 41, the wireless signal receiver 41 may be slid into the storing portion 42 through the inclined plane 425. Therefore, the wireless signal receiver 41 will be easily stored within the storing portion 42 by the depressing or sliding approach. By the way, a remaining space resulted when the wireless signal receiver 41 is stored within the storing portion 42 facilitates a user to withdraw the wireless signal receiver 41 from the storing portion 42.

From the above description, the storing portion and the resilient pad member of the wireless mouse cooperatively facilitate storing and fixing the wireless signal receiver within the storing portion. The resilient pad member is deformed in response to an external force and returns to its original shape due to a restoring force generated from the compressed resilient pad member. Therefore, even if the process of removing/inserting the wireless signal receiver from/into the storing portion is repeatedly done for a long term, the resilient pad member is still useful. The use of the resilient pad member is effective to overcome the prior art drawback of allowing the wireless signal receiver to be interference fitted into the storing portion, so that the wireless signal receiver is securely positioned within the storing portion without loosening or falling off.

The present invention is illustrated by referring to a wireless mouse. Nevertheless, the present invention can be applied to other computer's wireless peripheral device having the main body and the wireless signal receiver similar to the wireless mouse of the present invention, for example, a wireless keyboard or a wireless joystick.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless cursor control device for use with a computer system, comprising:
   a main body for generating a wireless signal to control a cursor of said computer system;
   a wireless signal receiver swappable to be electrically connected to said computer system for receiving said wireless signal;
   a storing portion disposed in said main body for accommodating said wireless signal receiver; and
   a resilient pad member engaged with the bilateral sides of said storing portion, and deformed to generate a restoring force when said wireless signal receiver is inserted into said storing portion, wherein said resilient pad member is sustained against said wireless signal receiver according to said restoring force; wherein said storing portion comprises a first indentation structure and a second indentation structure in the bilateral side thereof to be engaged with said resilient pad member; wherein said storing portion further comprises a third indentation structure for accommodating a universal serial bus connector of said wireless signal receiver therein, thereby facilitating positioning said wireless signal receiver within said storing portion;
   a power switch unit in communication with said third indentation structure of said storing portion, wherein said wireless cursor control device is powered off when said wireless signal receiver is stored within said storing portion and said universal serial bus connector of said wireless signal receiver touches said power switch unit.

2. The wireless cursor control device according to claim 1 wherein said main body is a main body of a wireless mouse, and said computer system is selected from one of a personal computer and a notebook computer.

3. The wireless cursor control device according to claim 1 wherein said resilient pad member includes a first resilient semi-cylindrical pad and a second resilient semi-cylindrical pad to be sustained against said wireless signal receiver when said wireless signal receiver is stored within the storing portion.

4. The wireless cursor control device according to claim 3 wherein said first resilient semi-cylindrical pad and said second resilient semi-cylindrical pad are respectively embedded within said first indentation structure and said second indentation structure, and have a first trench structure and a second trench structure engaged with bilateral edges of a bottom plate of said storing portion.

5. The wireless cursor control device according to claim 1 wherein said wireless signal receiver further comprises a first notch and a second notch to be engaged with said first resilient semi-cylindrical pad and said second resilient semi-cylindrical pad of said resilient pad member.

6. The wireless cursor control device according to claim 1 wherein said wireless signal receiver is stored within said storing portion by a depressing approach, and said first resilient semi-cylindrical pad and said second resilient semi-cylindrical pad of said resilient pad member are sustained against said wireless signal receiver after said resilient pad member is engaged within said storing portion.

7. The wireless cursor control device according to claim 1 wherein the length of said storing portion is slightly greater than that of said wireless signal receiver, and said storing portion has an inclined plane for facilitating said wireless signal receiver to be stored within said storing portion in a slidable manner, so that said first resilient semi-cylindrical pad and said second resilient semi-cylindrical pad of said resilient pad member are sustained against said wireless signal receiver.

* * * * *